United States Patent
Park et al.

(10) Patent No.: US 8,799,277 B2
(45) Date of Patent: Aug. 5, 2014

(54) PORTABLE DEVICE, PHOTOGRAPHY PROCESSING METHOD, AND PHOTOGRAPHY PROCESSING SYSTEM HAVING THE SAME

(75) Inventors: Yong Gook Park, Yongin-si (KR); Ji Hyeon Kweon, Yongin-si (KR); Hyun Jin Kim, Gwangju (KR); Myung Hyun Yoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 561 days.

(21) Appl. No.: 12/260,450

(22) Filed: Oct. 29, 2008

(65) Prior Publication Data

US 2009/0185763 A1   Jul. 23, 2009

(30) Foreign Application Priority Data

Jan. 21, 2008   (KR) ........................ 10-2008-0006145

(51) Int. Cl.
*G06F 7/00* (2006.01)
*G06F 17/30* (2006.01)

(52) U.S. Cl.
USPC .......................................... 707/724; 707/733

(58) Field of Classification Search
USPC .......... 348/207.99, 231.3; 707/732, 733, 758, 707/768, 724; 715/768
See application file for complete search history.

(56) References Cited

U.S. PATENT DOCUMENTS

| | | | | |
|---|---|---|---|---|
| 5,831,615 A | * | 11/1998 | Drews et al. | 715/768 |
| 6,829,607 B1 | * | 12/2004 | Tafoya et al. | 1/1 |
| 2002/0103813 A1 | * | 8/2002 | Frigon | 707/104.1 |
| 2004/0055017 A1 | * | 3/2004 | Delpuch et al. | 725/110 |
| 2006/0007315 A1 | * | 1/2006 | Singh | 348/207.99 |
| 2006/0040644 A1 | * | 2/2006 | Gibbs et al. | 455/412.1 |
| 2007/0053571 A1 | * | 3/2007 | Hayashi | 382/131 |
| 2007/0255695 A1 | * | 11/2007 | Hu et al. | 707/3 |
| 2007/0296739 A1 | * | 12/2007 | Lonn | 345/634 |
| 2008/0021876 A1 | * | 1/2008 | Ahern et al. | 707/3 |
| 2008/0091723 A1 | * | 4/2008 | Zuckerberg et al. | 707/104.1 |
| 2008/0177758 A1 | * | 7/2008 | Eldering | 707/100 |
| 2008/0243861 A1 | * | 10/2008 | Wassingbo et al. | 707/10 |
| 2008/0250066 A1 | * | 10/2008 | Ekstrand et al. | 707/104.1 |
| 2008/0282177 A1 | * | 11/2008 | Brown et al. | 715/763 |
| 2009/0023472 A1 | * | 1/2009 | Yoo et al. | 455/556.1 |
| 2009/0037477 A1 | * | 2/2009 | Choi et al. | 707/104.1 |

FOREIGN PATENT DOCUMENTS

JP       2006165821 A   *  6/2006
KR       10-0783191 B1     11/2007

* cited by examiner

*Primary Examiner* — James E Richardson
(74) *Attorney, Agent, or Firm* — Jefferson IP Law, LLP

(57) ABSTRACT

A portable device, a photography processing method, and a photography processing system having the same, the method including capturing a photo image; collecting identification (ID) information from neighboring devices; confirming ID information corresponding to the collected ID information; displaying one or more graphical user interface (GUI) elements corresponding to the confirmed identification (ID) information; and transmitting the captured photo image to a device having ID information corresponding to a selected GUI element. Furthermore, the photography processing method tags the identification information of the GUI element selected by the photographer to the captured image, stores the tagged image, performs a photo transmission and a tagging, improves user convenience, data management, and search efficiency, and quickly transmits the photo image of the target person without using additional navigation operations.

19 Claims, 14 Drawing Sheets

PORTABLE DEVICE, PHOTOGRAPHY PROCESSING METHOD, AND PHOTOGRAPHY PROCESSING SYSTEM HAVING THE SAME

CROSS-REFERENCE TO RELATED APPLICATIONS

This application claims the benefit of Korean Patent Application No. 2008-6145, filed on Jan. 21, 2008 in the Korean Intellectual Property Office, the disclosure of which is incorporated herein by reference.

BACKGROUND OF THE INVENTION

1. Field of the Invention

Aspects of the present invention relate to a portable device, a photography processing method, and a photography processing system using the same, and more particularly to a portable device to automatically tag a captured photo image and to transmit the tagged result, a photography processing method, and a photography processing system.

2. Description of the Related Art

Generally, a portable device is a terminal that is capable of being carried by a user and implementing a variety of operations using both wireless communication technologies and an application program. For example, the portable device may be a cellular phone, a Personal Digital Assistants (PDA), a smart phone, a Portable Multimedia Player (PMP), a digital camera, or a camcorder.

With the increasing development of communication technologies, the portable device has also begun to include a camera unit and a Near Field Communication (NFC) unit. Accordingly, the portable device provides a user with a variety of operations to easily capture and/or store desired moving images or still images, and transmits the stored images to another portable device.

If a photographer sets a mode of the portable device to an image capturing mode, the portable device displays a preview image received from the camera unit on a display screen. If the image-capturing key is entered, the images received from the camera unit are stored in a storage unit (such as a memory). During the image transmission, the user selects a photo-transmission item from among menus of the display screen using a navigation operation. The user searches for a target at which the photo will be received, and transmits the photo to the searched target using a wireless communication operation.

However, if the portable device captures a large number of photos during a short period of time and there are a variety of photos captured by another person, the user must change file names of the captured photos to a name of the photographer, resulting in greater inconvenience of use. Recently, a new technique capable of recognizing a user's face contained in the captured image using image recognition technology is being developed. However, the above-mentioned technique uses a high-performance processor and a long processing time, resulting in occurrences of incomplete recognition. The portable device including a limited processor cannot simultaneously perform the image-capturing operation and analyze the captured person in real time.

In order to transmit the captured image to another device, the portable device selects the photo-transmission item from among the menus of the display screen by the navigation operation, searches for a target person of the photo image to be transmitted, and performs a wireless communication operation. Accordingly, a large number of manual operations of the user are required, resulting in greater inconvenience of use and a long period of time.

SUMMARY OF THE INVENTION

Aspects of the invention to provide a portable device to capture a photo image, to automatically tag the captured photo image, and to transmit the tagged photo image to a target person, and a photography processing method, and a photography processing system having the same.

According to an aspect of the present invention, there is provided a method of processing a photo image in a portable device, the method including: capturing the photo image; displaying identification information of at least one neighboring item that is located in a vicinity of the portable device; and tagging identification information selected by a user, from among the displayed identification information, to the captured photo image, and storing a result of the tagging.

According to another aspect of the present invention, there is provided a method of processing a photo image in a portable device, the method including: capturing the photo image; collecting identification (ID) information from neighboring items; confirming ID information corresponding to the collected ID information; displaying a GUI element corresponding to the confirmed ID information; and tagging ID information selected by a user to the captured photo image, and storing a result of the tagging.

According to another aspect of the present invention, there is provided a method of processing a photo image in a portable device, the method including: capturing a photo image; collecting identification (ID) information from neighboring devices in response to a capturing of the photo image; confirming ID information corresponding to the collected ID information; displaying at least one GUI element corresponding to the confirmed identification (ID) information; and transmitting the captured photo image to a device having identification (ID) information corresponding to a GUI element selected by a user, from among the displayed at least one GUI element.

According to yet another aspect of the present invention, there is provided a portable device including: a display to display a GUI element; a camera unit to capture a photo image; a storage unit to store an address directory in which identification information is registered; and a controller to control a capturing of the photo image by the camera unit, to display identification information of neighboring items on the display, and to tag identification information selected by a user, from among the displayed identification information, to the captured photo image, and storing a result of the tagging.

According to still another aspect of the present invention, there is provided a portable device including: a display to display a GUI element; a camera unit to capture a photo image; a near field communication unit to perform near field communication; and a controller to control a capturing of the photo image by the camera unit, to display identification information of neighboring items on the display, and to transmit the captured photo image to a device having an ID corresponding to identification information selected by a user, from among the displayed identification information, via the near field communication unit.

According to another aspect of the present invention, there is provided a photography processing system including: at least one first portable device to transmit respective identifiers (ID); and a second portable device including: a camera unit to capture a photo image, a near field communication unit to perform a near field communication, and a controller to control a capturing of the photo image by the camera, to control a collecting of each ID from the at least one second portable device by the near field communication unit, to confirm identification information corresponding to the collected IDs, to display a GUI element corresponding to the confirmed identification information, to perform tagging of identification information selected by a user to the captured photo image and to store the tagged result, and/or to transmit the captured photo image to a device having ID information corresponding to a GUI element selected by the user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
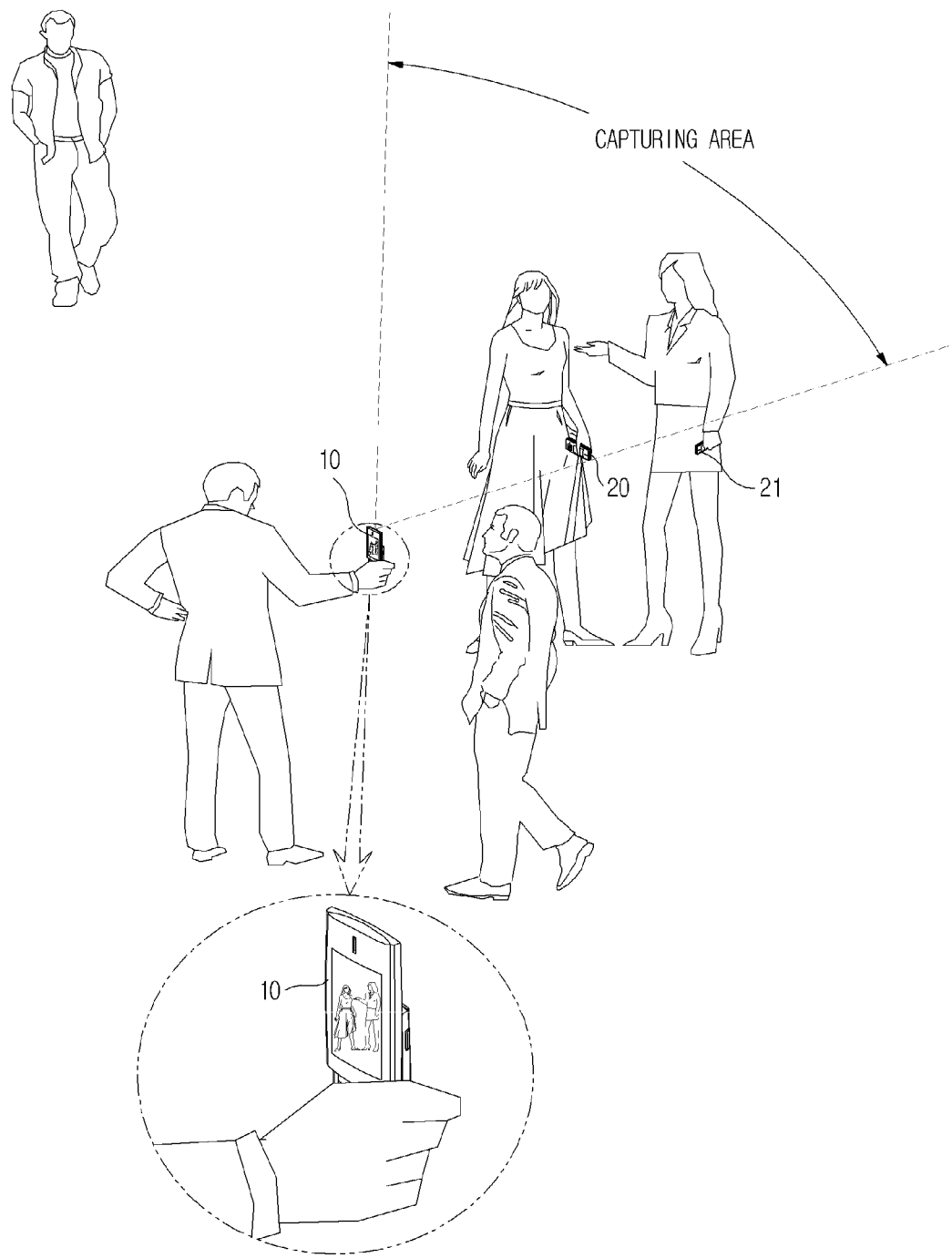
FIG. 1 is a conceptual diagram illustrating a photography processing system's portable device to capture a target or objective person, and to automatically tag and/or transmit the captured image, according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a conceptual diagram illustrating a photography processing system's portable device to capture a target or objective person, and to automatically tag and/or transmit the captured image, according to an embodiment of the present invention. Referring to FIG. 1, the photography processing system includes the portable device 10 to capture and/or transmit a photo image, and portable terminals 20 and 21 carried by other persons (for example, neighboring devices to the portable device 10). For reference, FIG. 1 shows that the photographer uses the portable device 10 to capture two women, while two men pass outside of the captured image. In this case, it is assumed that all of two women and two men carry portable devices.

The portable device 10 includes a camera unit (not shown) and a near field communication (NFC) unit (not shown). The portable device 10 captures a target person contained in the captured area using the camera unit, generates the captured image of the target person, and collects IDs of the other (for example, peripheral) portable devices 20 and 21 using the NFC unit when the target person is captured.

The portable device displays at least one graphical user interface (GUI) element indicating the target person's information matched to an address directory on a display (such as a touch-screen) on the basis of the collected IDs, tags information of the GUI element selected by the photographer to the generated image, and stores the tagged result in the memory. Also, the portable device 10 transmits the generated image having an ID corresponding to the GUI element selected by the photographer using the NFC unit.

Each of the portable terminals 20 and 21 mounted to the portable device 10 includes a communication unit communicating with the NFC unit. Upon receiving the request from the portable device 10, the portable terminals 20 and 21 wirelessly transmit unique IDs of the portable terminals 20 and 21 to the portable device 10.

The portable device 10 and the portable terminals 20 and 21 are capable of implementing various operations using a wireless communication technology and an application program. For example, the terminals may include a cellular phone, a Personal Digital Assistant (PDA), a smart phone, a Portable Multimedia Player (PMP), a digital camera, and/or a camcorder. The portable device 10 can support at least the camera operation and the NFC operation, and the portable terminals 20 and 21 can support at least the NFC operation.

Figure 2:
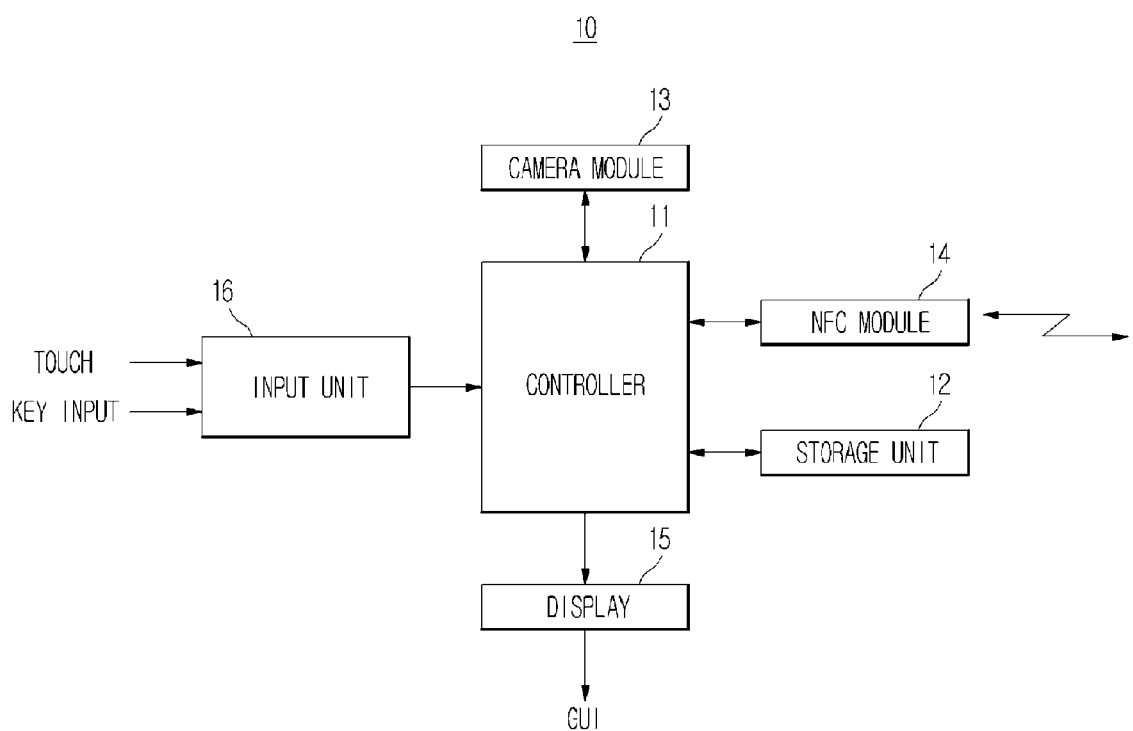
FIG. 2 is a control block diagram illustrating a portable device of FIG. 1, according to an embodiment of the present invention.

FIG. 2 is a control block diagram illustrating a portable device of FIG. 1, according to an embodiment of the present invention. Referring to FIG. 2, the portable device 10 includes a controller 11, to execute a command, and to execute operations associated with the command. For example, the controller 11 can receive and/or process input and output data between controllable constituent elements of the portable device 10 using commands searched from the memory. The controller 11 can be implemented on a single chip, several chips, and/or electrical elements. For example, a variety of architectures may be used as the controller 11 (such as a dedicated or embedded processor, a single-purpose processor, an ASIC, etc.). Furthermore, the controller 11 may execute computer codes along with an operating system (OS), generate data, and use the generated data. The operating system (OS) may be OS/2, DOS, Unix, Linux, Palm OPS, Windows, etc.

The storage unit 12 stores computer codes and/or data for use in the portable device 10. For example, the storage unit 12 may store a scheduler, a phone book, and other storage data. The storage unit 12 may be a volatile memory (such as RAM) or a non-volatile memory (such as ROM, flash memory, or a hard disk drive).

The portable device 10 includes a camera unit 13 connected to the controller 11. The camera unit 13 captures moving images and photos. Furthermore, the camera unit 13 includes a lens equipped with a light-receiving unit and an image sensor to output an incident light beam of the lens as digital signals. The image sensor performs image processing on the analog signal incident on the lens, and outputs a digital image. The camera unit 13 can recognize tag information contained in the captured image. The tag information includes information indicating capturing conditions. For example, the tag information may include a file name, a file size, a file date, a device's manufacturing company, a device model name, a capturing date, a resolution, a flash use or unused status, a focal length, a shutter speed, an iris value, a distance to a target object (i.e., a target-object distance), an exposure correction, a light-measurement mode, etc.

The portable device 10 includes the NFC unit 14 connected to the controller 11. The NFC unit 14 performs a NFC operation between peripheral devices. For example, the NFC unit 14 allows two devices to perform a data exchange at a data transfer rate of 424 Kbps in a radio frequency (RF) band of 13.56 MHz. The NFC unit 14 can be wirelessly used in a near field of 10 m, though aspects of the present invention are not limited thereto. Furthermore, the NFC unit 14 can be compatible with Bluetooth, Wi-Fi/802.11, Ultra Wide Band (UWB), etc. The NFC unit 14 may be a low power unit, and may perform P2P data transmission. For example, the NFC unit 14 communicates with peripheral portable terminals, requests IDs from the peripheral portable devices, receives the requested IDs, and transmits the received IDs to the controller 11. Also, the NFC unit 14 receives a command from the controller 11, and transmits image data (e.g., photos) to the portable terminals of the target object.

The portable device 10 includes a display 15 connected to the controller 11. The display 15 may include a liquid crystal display (LCD). The display 15 displays a photographer interface (i.e., a GUI) providing a user interface between applications being executed on the operating system (OS). The GUI provides a program and file- and operation-options implemented with graphic images. The graphic images may include a window, a dialog box, a menu, an icon, a cursor, a tool bar, etc. Also, the graphic images may be arranged according to a predetermined layout. During the GUI operation, the photographer may select or activate the images in order to initiate operations associated with various graphic images. For example, a tagging button for image tagging, and a transmission button for photo transmission can be selected.

The portable device 10 also includes an input unit 16 connected to the controller 11. The input unit 16 enters data in the portable device 10. Specifically, the input unit 16 may be used to perform the selection associated with the GUI on the display 15. The input unit 16 may include a touch-sensing device that receives input data from a user's touching, and outputs the received data to the controller 11. For example, the touch-sensing device may correspond to a touch-pad or a touch-screen. The touch-sensing device recognizes the user's touch, and recognizes the touched position on the touch-sensing surface. Then, the touch-sensing device informs the controller of the touch, and the controller 11 analyzes the touch. For example, the controller 11 may begin a necessary action according to a specific touching of the user. The touch-sensing device may be based on a capacitive sensing, a resistive sensing, a surface-elastic-wave sensing, a pressure sensing, an optical sensing, etc. Also, the touch-sensing device may be based on a single-point sensing or a multi-point sensing. The single-point sensing may distinguish only a single touching from others, while the multi-point sensing may distinguish several touches that are simultaneously or successively performed. Thus, the input unit 16 may be a touch-screen that is arranged on the display 15 or is arranged ahead of the display. The touch-screen may be integrated with the display 15 or may be independent of the display 15. Furthermore, the touch-screen may be arranged in front of the display 15, such that the photographer may directly manipulate the GUI. However, it is understood that aspects of the present invention are not limited thereto. For example, the input unit 16 may use a voice recognition technology to receive inputs, may receive inputs through input devices such as a keypad or a dial, or may receive inputs through a touch device other than a user's finger. Accordingly, the input unit 16 may be a keypad arranged on the main body. The keypad may include number buttons of 0-9, a menu button, a confirm button, a transmission button, a call button, a DEL button, an END button, * and # buttons, navigation buttons (↑,↓,←,→), an image-capturing button, etc. Thus, the photographer manipulates the keypad such that a key input signal corresponding to a desired key is transmitted to the controller 11.

Figure 3:
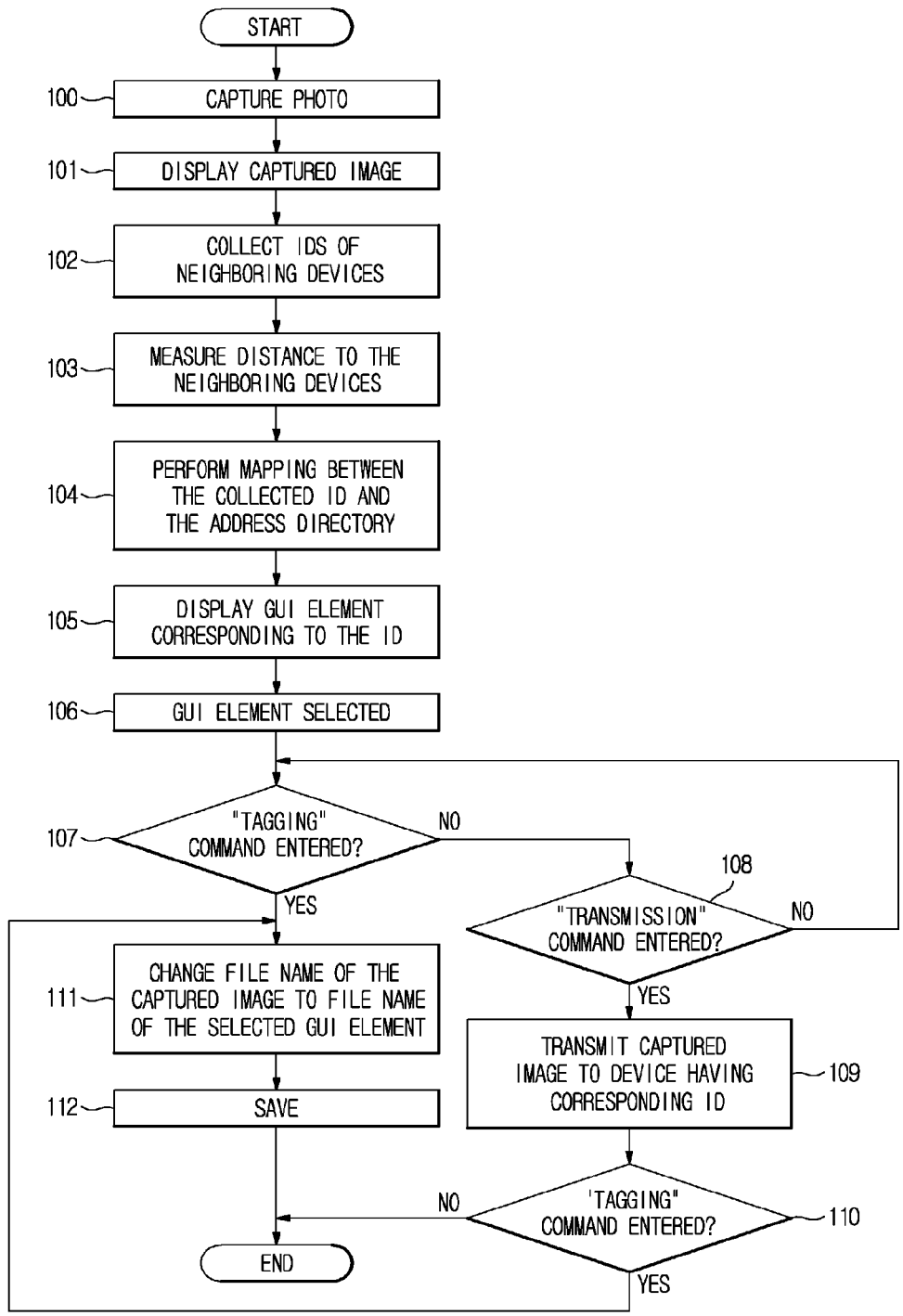
FIG. 3 is a flow chart illustrating a photography processing method of a portable device, according to an embodiment of the present invention.

FIG. 3 is a flow chart illustrating a photography processing method of a portable device, according to an embodiment of the present invention. Referring to FIG. 3, the portable device 10 captures a photo upon receiving a command from a photographer in operation 100. For example, the photographer manipulates the input unit 16 of the portable device 10, such that an operation mode is switched to an image-capturing mode. The photographer enters an image-capturing button, such that a series of commands are applied to the portable device 10. The photographer's command is transmitted to the controller 11. The controller 11 displays a target object to be captured on the display, and controls operations of the camera unit 13, such that the camera unit 13 captures the target object.

Figure 4:
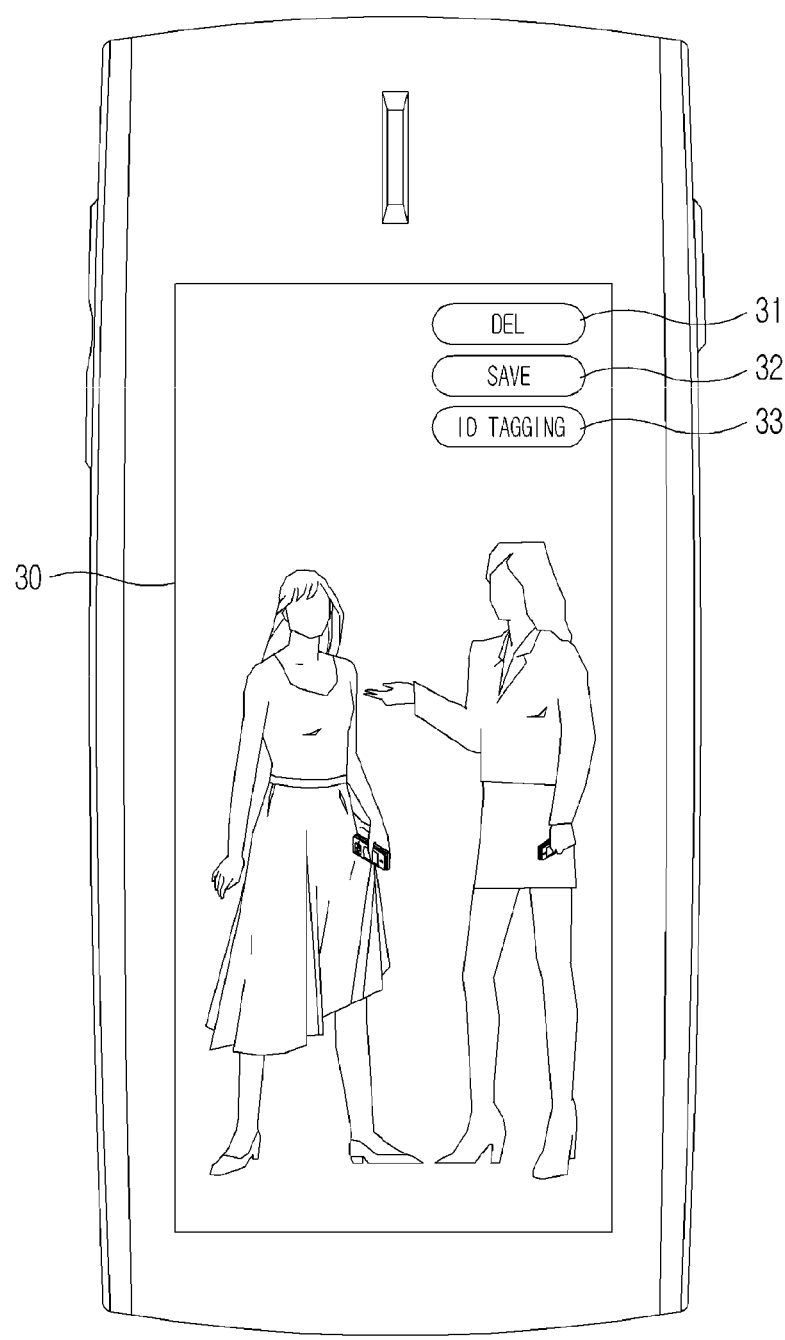
FIG. 4 shows a screen to display an image captured by a portable device, according to an embodiment of the present invention.

The captured image is displayed on the display 15 by the controller 11 in operation 101. As shown in FIG. 4, the controller 11 displays the captured image on an LCD 30 of the display 15 so that the photographer is able to view the captured image. A variety of buttons may be provided on the LCD (such as a "DEL" button 31 to delete the captured image, a "SAVE" button 32 to store the captured image, and an "ID tagging" button 33 to perform ID tagging of the captured image." The DEL, SAVE, and ID tagging buttons 31, 32, and 33 are located at a right upper part of the display 15, although aspects of the present invention are not limited thereto. For example, other, additional, or no buttons may be displayed on the display 15 according to other aspects. Furthermore, the buttons may be displayed on a lower and/or left part of the display 15.

Figure 5:
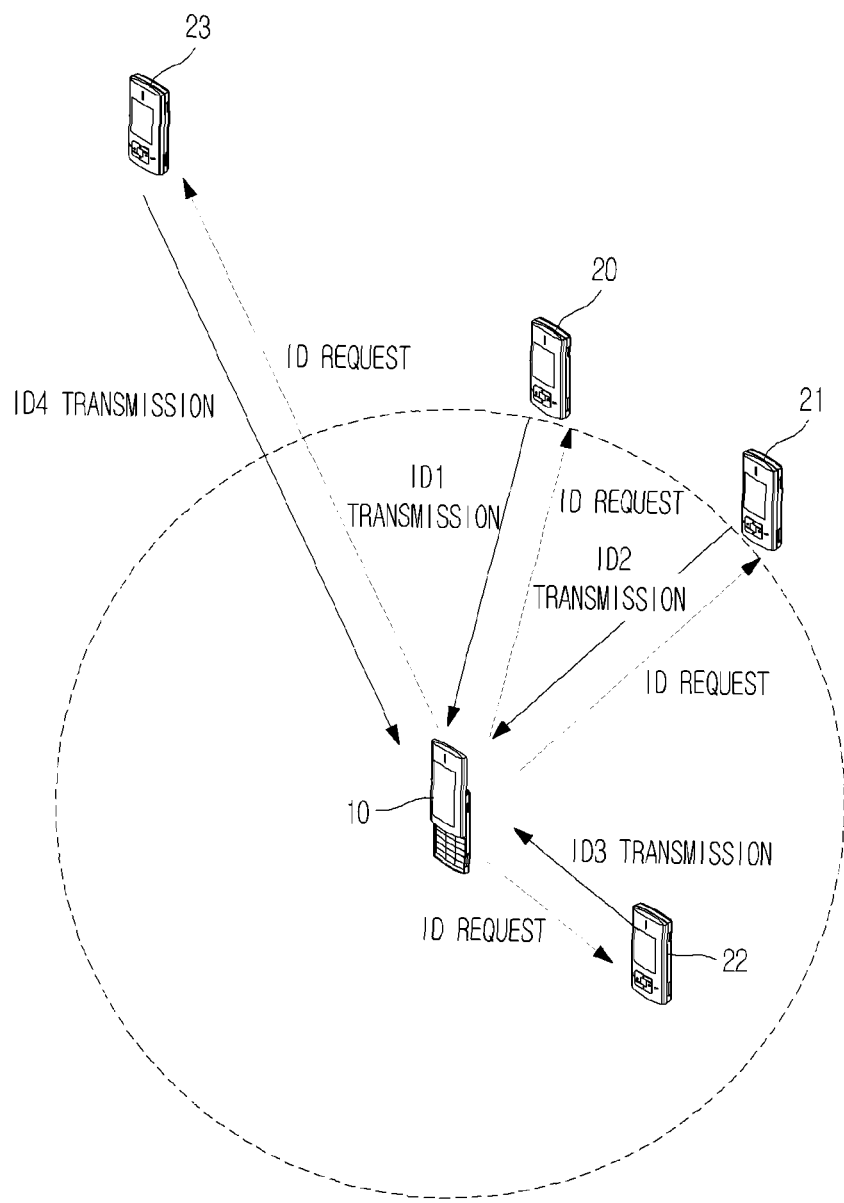
FIG. 5 is a conceptual diagram illustrating a method of receiving ID information from each neighboring terminal of the portable device, according to an embodiment of the present invention.

The portable device 10 displays the captured image, and collects unique IDs from other (for example, neighboring) portable terminals in operation 102. When the photo is captured and/or after the photo is captured (or in response to the capturing of the photo), the controller 11 requests IDs from the neighboring portable terminals of the portable device 10, and receives the requested IDs. As shown in FIG. 5, if four portable terminals 20, 21, 22, and 23 having different IDs are located in the vicinity of the portable device 10, the controller 11 communicates with the four portable terminals 20, 21, 22, and 23 via the NFC unit 14, requests IDs from the individual portable terminals 20, 21, 22, and 23, and receives the requested IDs. Specifically, the portable terminal 10 receives ID1 from the portable terminal 20 having ID1, receives ID2 from the portable terminal 21 having ID2, receives ID3 from the portable terminal 23 having ID3, and receives ID4 from the portable terminal 24 having ID4. The individual received ID information is stored in the storage unit 12.

Figure 6:
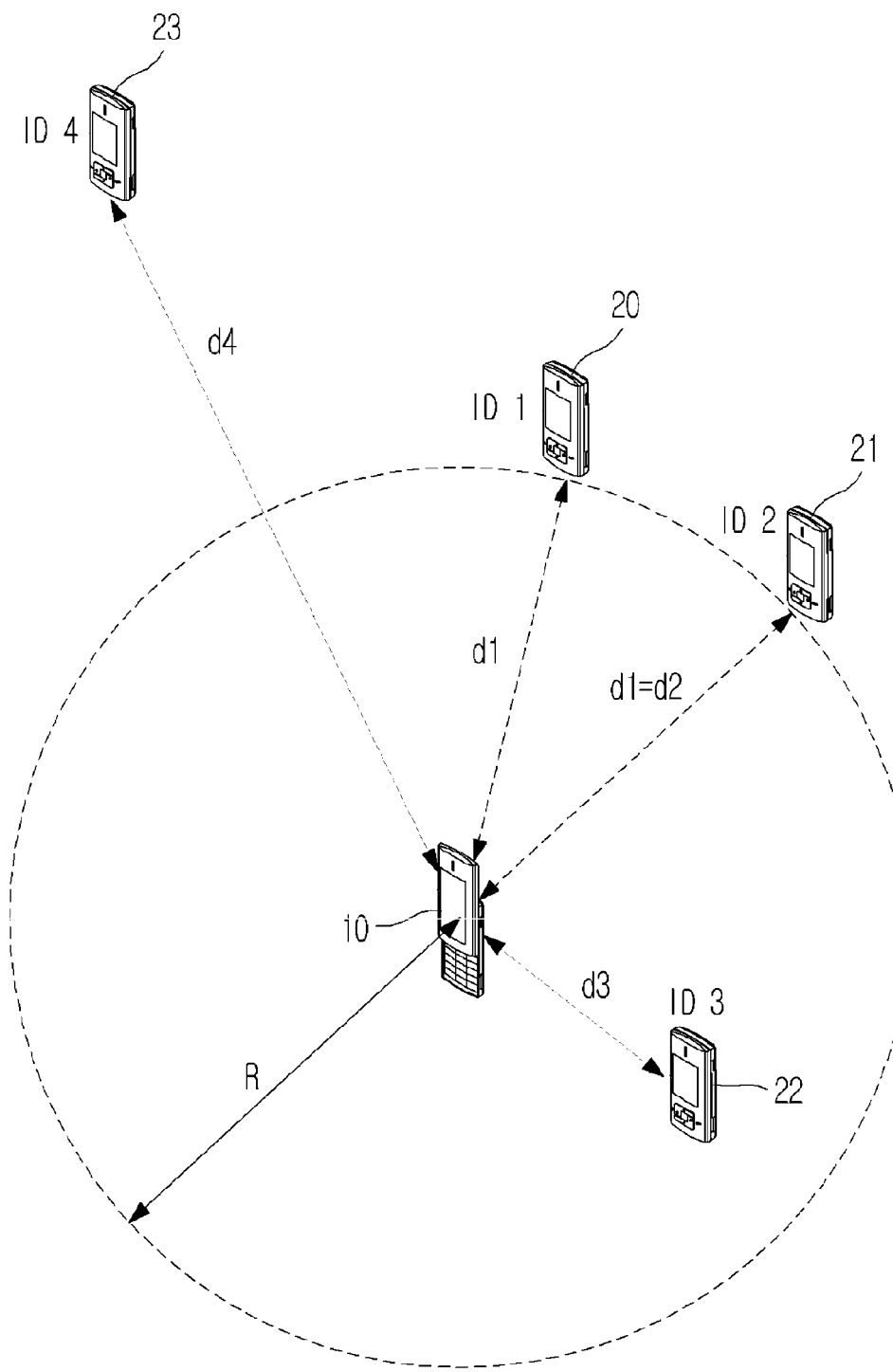
FIG. 6 is a conceptual diagram illustrating a method of measuring a distance from the portable device to a neighboring portable device, according to an embodiment of the present invention.

When collecting the IDs of the neighboring portable terminals 20, 21, 22, and 23 of the portable device 10, the portable device 10 measures a distance between the portable device 10 and each portable terminal 20, 21, 22, and 23 using, for example, a time gap between response signals of the individual portable terminals 20, 21, 22, and 23 upon receiving an ID request signal in operation 103. As shown in FIG. 6, if four portable terminals 20, 21, 22, and 23 having different IDs are located in the vicinity of the portable device 10, the controller 11 communicates with the four portable terminals via the NFC unit 14, checks a response time corresponding to the ID request signal of each portable terminal 20, 21, 22, and 23, and measures a distance from the portable device 10 to each of the four portable terminals 20, 21, 22, and 23 using the time gap between the response times. The measured distance information is stored in the storage unit 12. Specifically, the distance between the portable device 10 and the portable terminal 20 having ID1 is measured as "d1." The distance between the portable device 10 and the portable terminal 21 having ID2 is measured as "d2." The distance between the portable device 10 and the portable terminal 22 having ID3 is measured as "d3." The distance between the portable device 10 and the portable terminal 23 having ID4 is measured as "d4." In FIG. 6, "d1" and "d2" are equal to the target-object distance R of the captured image, "d3" is shorter than the target-object distance R, and "d4" is longer than the target-object distance R.

As described above, when the captured image is displayed, a variety of buttons may be displayed on the LCD 30 (for example, the "DEL" button 31 to delete the captured image, the "SAVE" button 32 to store the captured image, and the "ID tagging" button 33 to perform ID tagging of the captured image). The DEL, SAVE, and ID tagging buttons 31, 32, and 33 may be located at a right upper part of the LCD 30. The above-mentioned buttons 31, 32, and 33 are displayed when the captured image is displayed. Although the above-mentioned buttons 31, 32, and 33 are illustrated as arranged at a right upper part of the captured image, it is understood that the above buttons 31, 32, and 33 may be freely arranged at any place.

If the photographer touches the DEL button 31 on the LCD, the controller 11 recognizes the DEL command such that a currently-captured image is deleted from a memory. If the photographer touches the SAVE button 32, the controller 11 recognizes the SAVE command such that the currently-captured image is stored in the storage unit 12.

Figure 7:
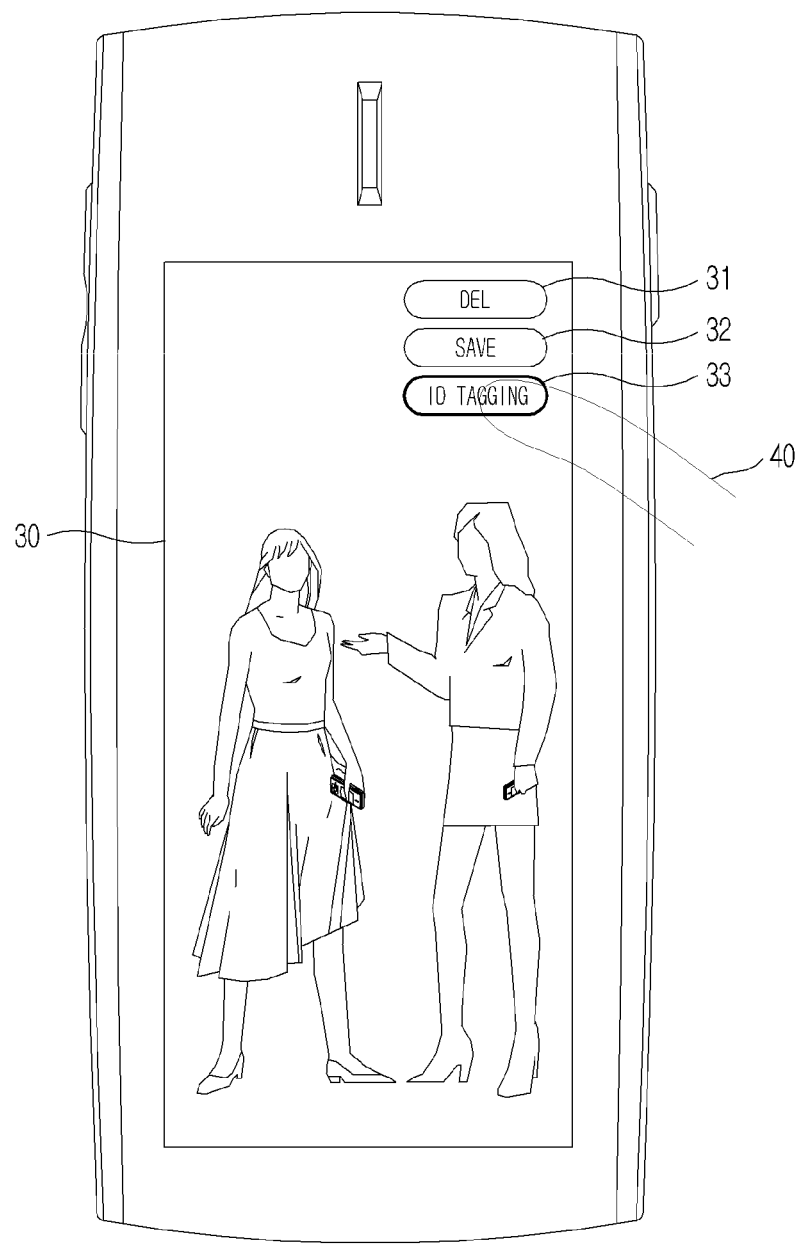
FIG. 7 shows an exemplary image formed when a photographer for the portable device of FIG. 4 enters an ID tagging command, according to an embodiment of the present invention.

If the photographer touches the ID tagging button 33 (as shown in FIG. 7), the controller 11 recognizes the ID tagging command of the currently-captured image, and maps the collected IDs (operation 102) to the address directory pre-stored in the storage unit 12 in operation 104. Referring to the mapping process between the collected IDs and the address directory, the address directory may include user identification information for each ID (for example, a phone number, a name, a nickname, a mail address, etc.). Accordingly, the controller compares the collected ID with the ID registered in the address directory to search for the same ID, and recognizes identification information corresponding to the searched ID.

Figure 8:
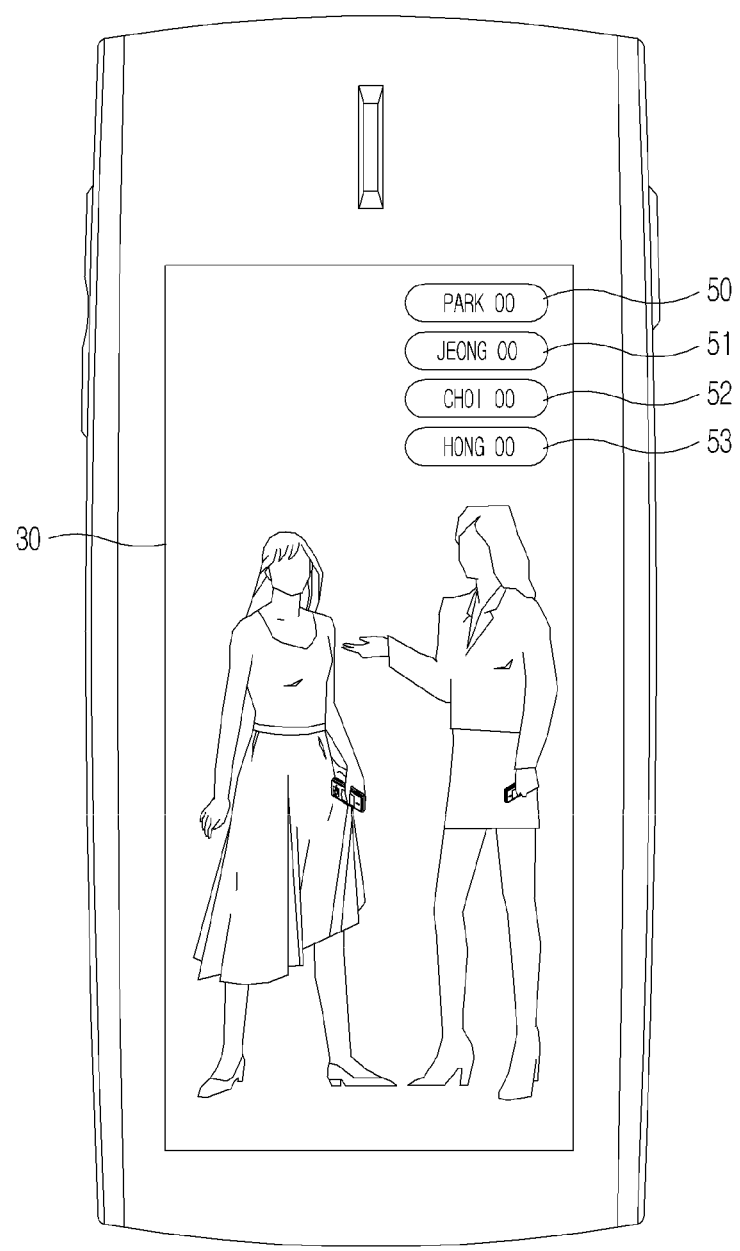
FIG. 8 shows an exemplary image on which a graphical user interface (GUI) element corresponding to an ID collected from a neighboring portable device is displayed on the portable device of FIG. 7 by an ID tagging command, according to an embodiment of the present invention.

The controller 11 performs the mapping between the collected ID and the address directory, and displays one or more GUI elements indicating identification information corresponding to the ID in operation 105. As shown in FIG. 8, the GUI elements 50, 51, 52, and 53 may be a name. According to an aspect of the present invention, the collected IDs are registered in the address directory so that the collected ID can be mapped to the address directory. Assuming that "ID1" is "PARK OO" 50, "ID2" is "JEONG OO" 51, "ID3" is "CHOI OO" 52, and "ID4" is "HONG OO" 53, each name is displayed by a GUI element selectable by the photographer or user of the portable device 10.

The GUI elements 50, 51, 52, and 53 may be associated with a specific mode. For example, the GUI elements 50, 51, 52, and 53 are displayed under the ID tagging mode. Furthermore, the GUI elements 50, 51, 52, and 53 may be displayed in various ways. For example, the GUI elements 50, 51, 52, and 53 may be located on the currently-displayed image, or may be formed of a semitransparent material having transparency of various levels, such that a current image arranged under the GUI elements 50, 51, 52, and 53 can be seen. Also, the GUI elements 50, 51, 52, and 53 are arranged at a predetermined position. For example, the GUI elements 50, 51, 52, and 53 may be arranged at a right upper part, a center part, a left upper part, a left lower part, or a left lower part of the LCD 30.

When the GUI elements 50, 51, 52, and 53 are displayed, individual GUI elements 50, 51, 52, and 53 may be arranged in the order of distance between the portable device 10 and each portable terminal, and the number of displayed GUI elements 50, 51, 52, and 53 may be limited. In this case, the GUI elements 50, 51, 52, and 53 are arranged in the order of distances from the GUI element 50, 51, 52, and 53 to the target-object distance of the captured image.

For example, assuming that the order of d1=d2>d3>d4 is established in association with the target-object distance of the captured image, the "PARK OO" button 50, the "JEONG OO" button 51, the "CHOI OO" button 52, and the "HONG OO" button 53 are sequentially arranged. Alternatively, the order of "JEONG OO" button 51, "PARK OO" button 50, "CHOI OO" button 52, and "HONG OO" button 53 may be established.

Figure 9:
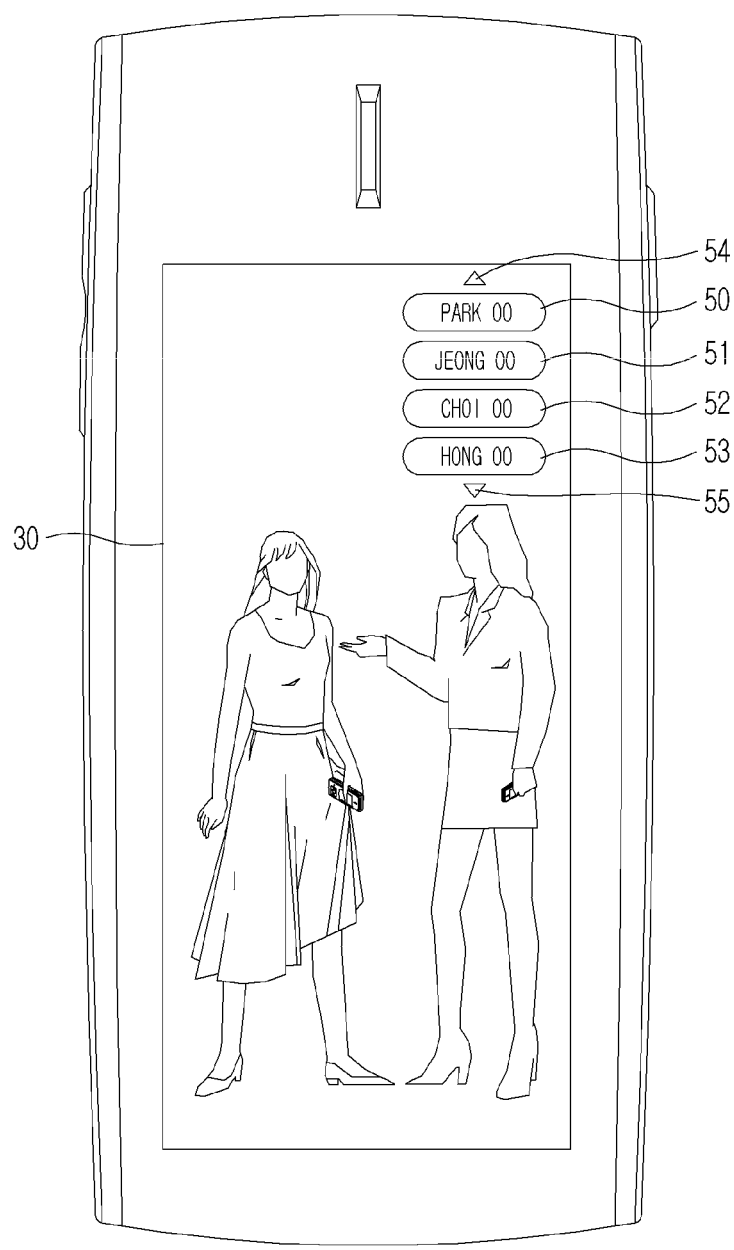
FIG. 9 shows a method of displaying a GUI element when all the GUI elements corresponding to IDs collected from neighboring portable terminals of the portable device of FIG. 7 cannot be displayed on a single screen.

Referring to FIG. 9, if there is a large number of GUI elements 50, 51, 52, and 53 to be displayed, scroll buttons 54 and 55 to scroll the GUI elements 50, 51, 52, and 53 are provided (for example, above and below the displayed GUI elements 50, 51, 52, and 53). Whenever the photographer or user selects individual scroll buttons 54 and 55, the GUI elements 50, 51, 52, and 53 are scrolled upward or downward so that other non-displayed GUI elements are displayed.

Figure 10:
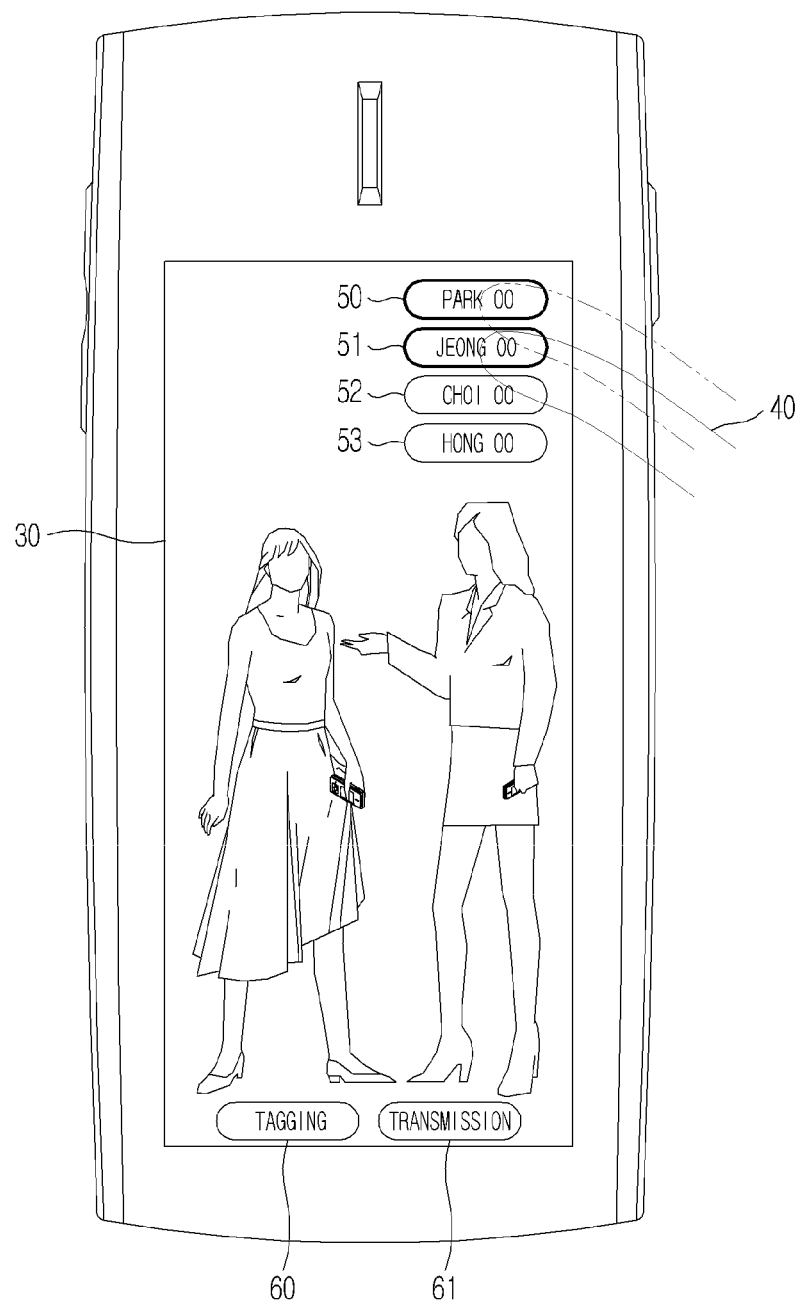
FIG. 10 shows an example image formed when the photographer of the portable device of FIG. 7 selects two upper GUI elements from among the GUI elements, according to an embodiment of the present invention.

After displaying the GUI elements 50, 51, 52, and 53, the photographer or user 40 selects a desired GUI element in operation 106. As shown in FIG. 10, the photographer or user 40 may select any one of four GUI elements 50, 51, 52, and 53, or may select at least two GUI elements 50 and 51 at the same time. The GUI elements selected by the photographer or user 40 may allow the GUI element to be switched from a first status to a second status, such that the photographer or user 40 is able to confirm the selection of the selected GUI element. This switching action may include a fading-in, a fading-out, a popping, a growing, etc. FIG. 10 shows the fading-in implementation as the switching of the GUI element. If the photographer or user 40 touches the GUI element, the touching result is transmitted to the controller 11, and the controller 11 recognizes which one or more of the GUI elements 50, 51, 52, and 53 has been touched and selected.

As shown in FIG. 10, if the photographer or user 40 selects any one of several GUI elements 50, 51, 52, and 53, a "Tagging" button 60 and a "Transmission" button 61 are displayed at a lower part of the captured image, although it is understood that aspects of the present invention are not limited thereto. For example, the buttons 60 and 61 may be displayed at an upper or a middle portion of the captured image. The "Tagging" button 60 is a command button to change a file name of the captured image to an identification information (e.g., a phone number and a name) corresponding to the GUI element selected by the photographer or user 40. The "Transmission" button 61 is a command button to transmit the captured image to a portable terminal having an ID corresponding to the GUI element selected by the photographer or user 40.

Figure 11:
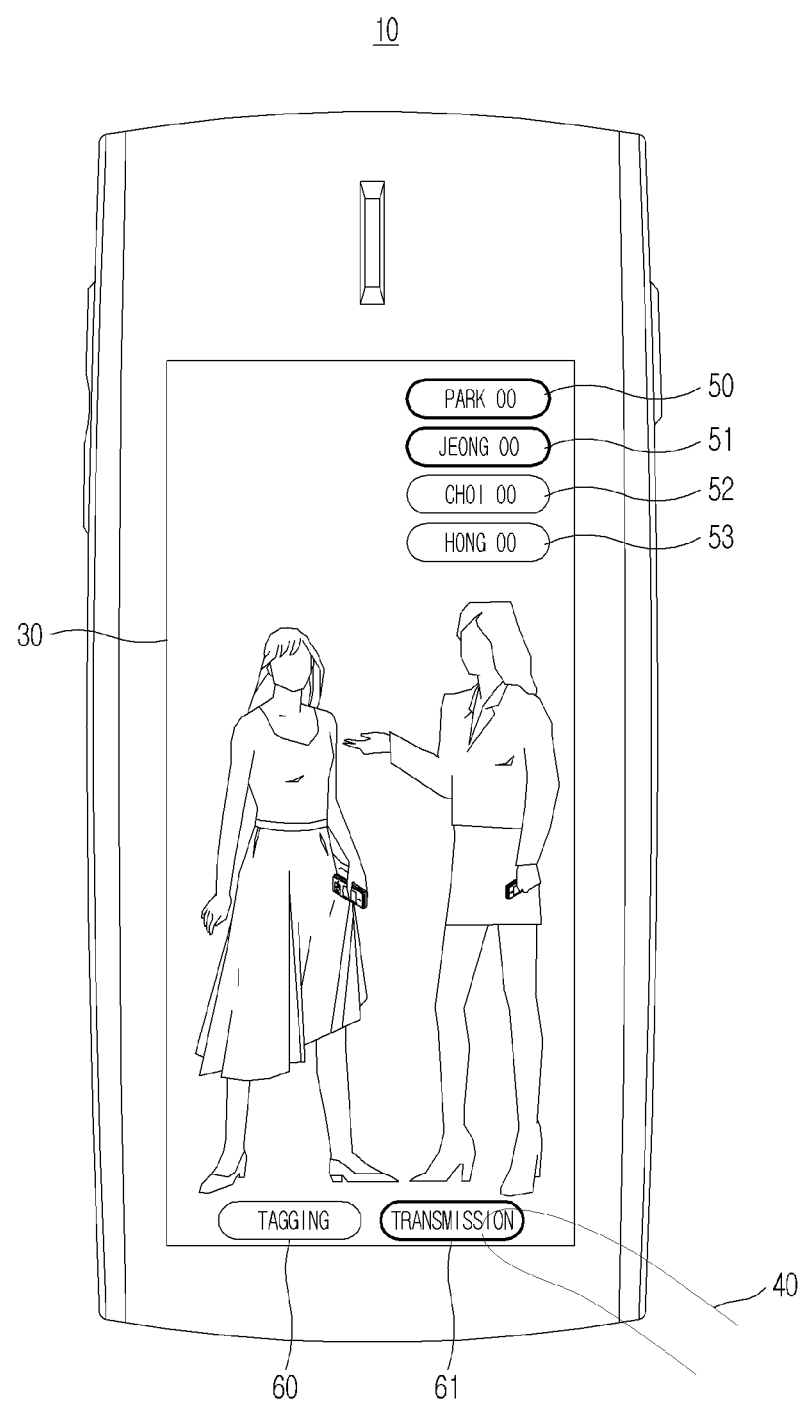
FIG. 11 shows an example image formed when the photographer of the portable device of FIG. 10 enters a transmission command, according to an embodiment of the present invention.

If the GUI element is selected (operation 106), the controller 10 determines whether the "Tagging" button is entered in operation 107. As shown in FIG. 11, if first and second buttons (i.e., PARK OO" button 50 and "JEONG OO" button 51) are selected from among the four GUI elements 50, 51, 52, and 53, and the "Tagging" button 60 or the "Transmission" button 61 is touched, the touching result is transmitted to the controller 11. Accordingly, the controller 11 recognizes which of the buttons has been touched in order to determine which of the GUI elements 50, 51, 52, and 53 has been selected.

If the "Transmission" command has been selected by the photographer or user 40 in operation 108, the captured image is transmitted to the portable terminal having an ID corresponding to the selected GUI element in operation 109. As a result, the screen image of FIG. 12 may be displayed such that the controller indicates that the photo image has been transmitted, and queries whether to perform tagging of the captured image.

Figure 12:
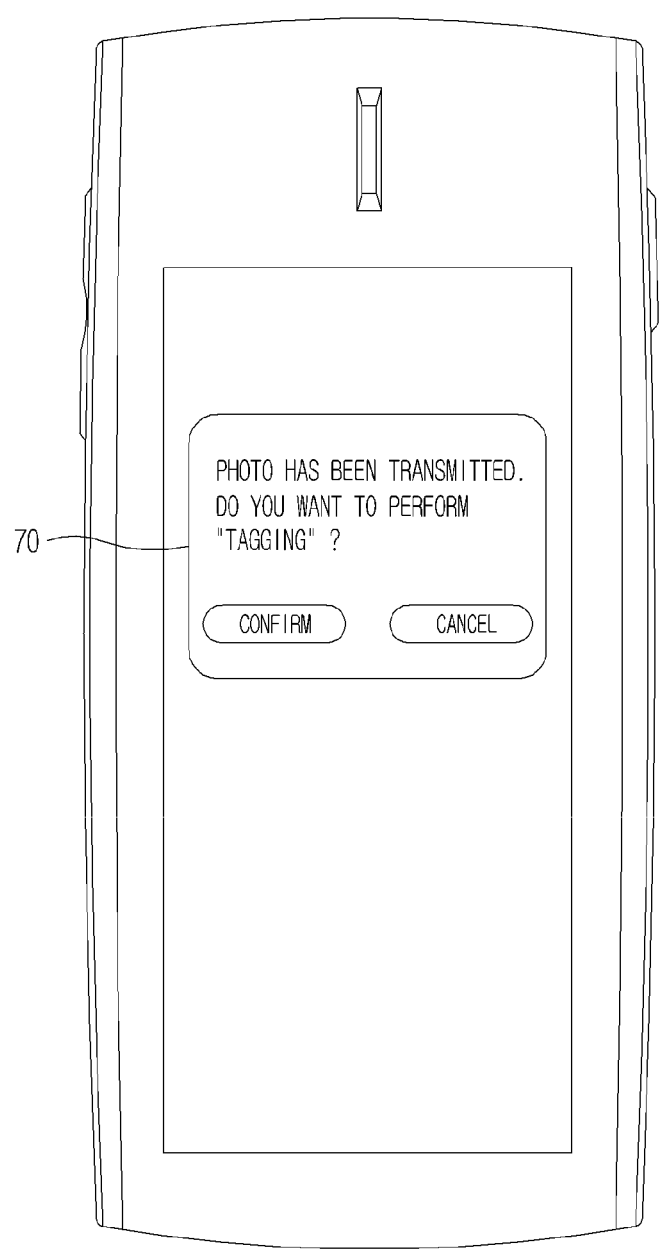
FIG. 12 shows an example resulting image acquired by the transmission command of the photographer of the portable device of FIG. 11, according to an embodiment of the present invention.

After the screen image of FIG. 12 is displayed, the controller 11 determines whether the photographer or user 40 enters the "Tagging" command in operation 110. If the photographer or user 40 touches the "Cancel" button on the display screen of FIG. 12, the controller terminates the control operation without performing the tagging and/or storing operations of the captured image. If the photographer or user 40 touches the "Confirm" button, the controller recognizes the tagging command and performs the tagging and/or storing operations of the captured image.

Figure 13:
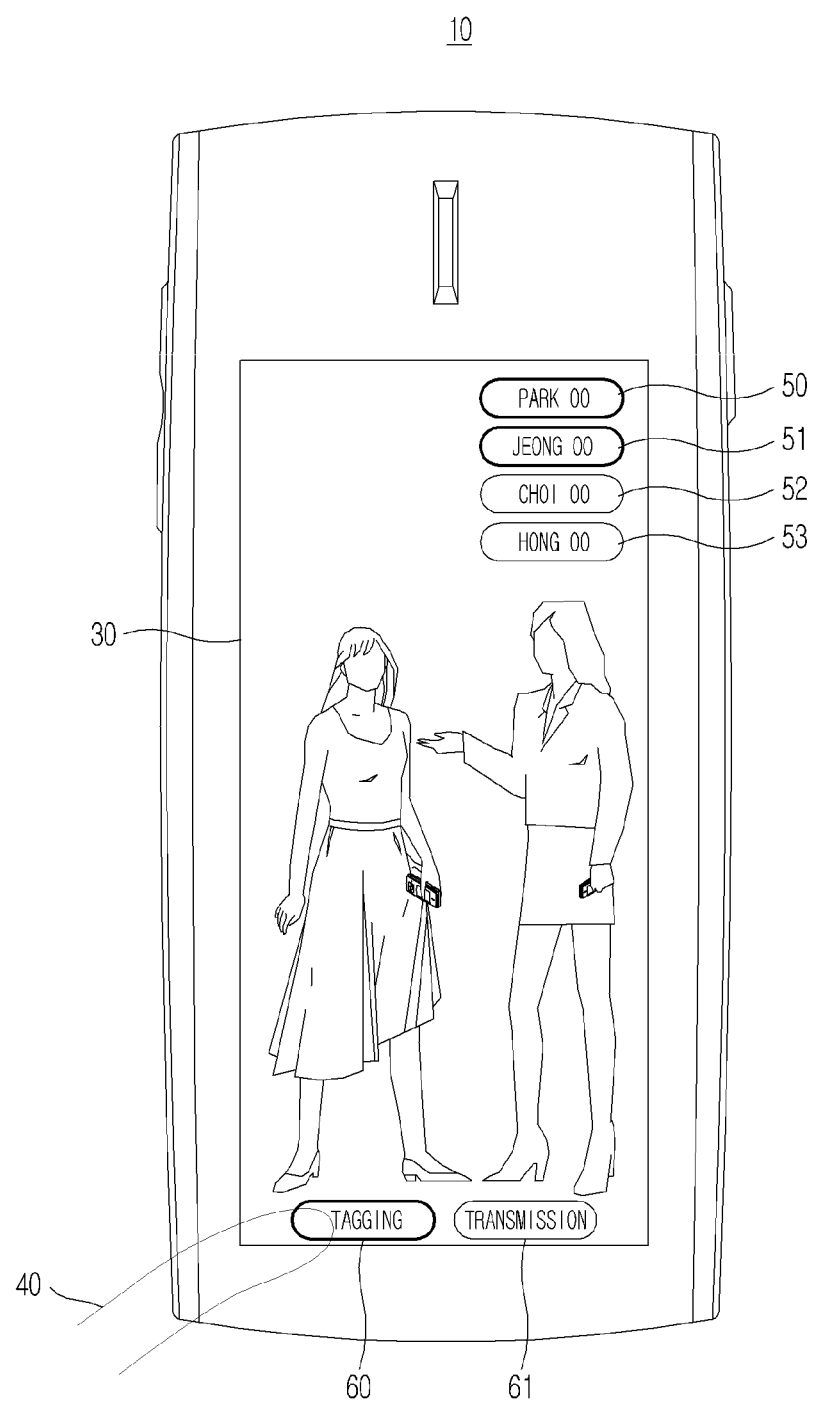
FIG. 13 shows an example resulting image formed when the photographer of the portable device of FIG. 10 enters a tagging command, according to an embodiment of the present invention.

In the meantime, if the photographer or user 40 has entered the "Tagging" button 60 of FIG. 13 in operation 107, the file name of the captured image is changed to a file name corresponding to the GUI element selected by the photographer or user 40 in operation 111. For example, as shown in FIG. 13, if the photographer or user 40 selects two buttons (i.e., "PARK OO" button 50 and "JEONG OO" button 51) from among the four GUI elements 50, 51, 52, and 53, the file name (e.g., photo08017_1.jpg) of the captured image may be changed to "PARK OO_JEONG OO.jpg." If the photographer selects a single GUI element, a current file name may be changed to a file name having one name. In the meantime, a phone number, a nickname, a device ID, and other identification information may be used as the above file name.

Figure 14:
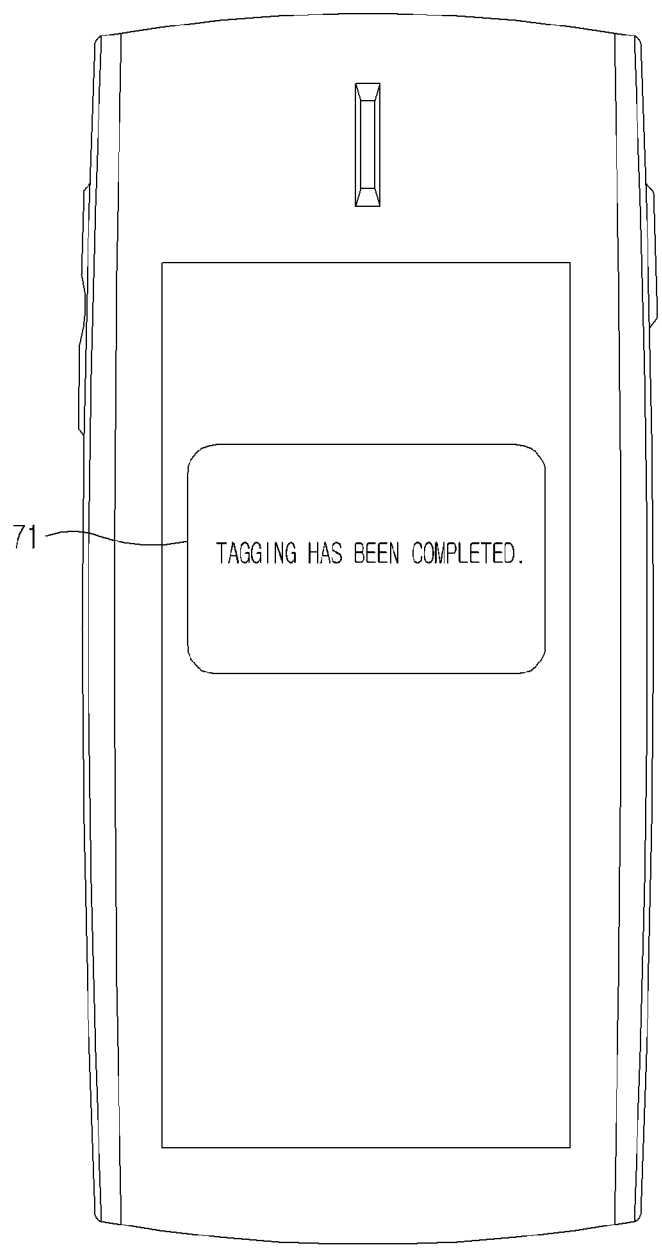
FIG. 14 shows an example resulting image formed when the photographer of the portable device of FIG. 13 enters a tagging command, according to an embodiment of the present invention.

After the tagging operation (operation 111) is performed, the captured image is stored in operation 112. Thereafter, the controller may inform the photographer or user 40 that the tagging operation has been completed on a screen 71 (as illustrated in FIG. 14), and terminates the control operation. Therefore, the file names of the stored images are indicative of image information, such that the photographer's recognition level increases. As a result, the photographer can easily search for the desired photo from among several photos, and searches for the stored images in various ways.

As is apparent from the above description, aspects of the present invention retrieve IDs of peripheral devices of a photographer when a photo image is captured, displays at least one GUI element indicating identification information on the basis of the collected IDs, transmits the captured image to a device having an ID corresponding to the GUI element selected by the photographer, tags identification information of the GUI element selected by the photographer to the captured image, stores the tagged image, performs a photo transmission operation and a tagging operation, improves user's convenience, data management, and search efficiency, and quickly transmits the photo image of a target person without using additional navigation operations.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of processing a photo image in a portable device, the method comprising:
    capturing, by the portable device, a photo image including a plurality of persons;
    determining respective IDentifier (ID) information corresponding to each of a plurality of devices, and respective distances between the portable device and each of the plurality of devices;
    associating each person from among the plurality of persons included in the captured photo image with respective contact information from an address book according to the determined respective ID information;
    displaying the captured photo image and a plurality of Graphical User Interface (GUI) elements that respectively correspond to the respective contact information, the plurality of GUI elements being arranged in an order sorted according to the determined respective distances; and transmitting the captured photo image to at least one device from among the plurality of devices corresponding to a GUI element from among the plurality of GUI elements based on the respective contact information.

2. The method of claim 1, wherein the at least one device to which the captured photo image is transmitted is determined by a selection of a user from among the plurality of GUI elements.

3. The method of claim 1, wherein the respective contact information comprises at least one of a phone number, a name, a nickname, and a mail address.

4. The method of claim 1, wherein the captured photo image is transmitted to the at least one device using the contact information.

5. The method of claim 1, wherein the captured photo image is transmitted to the at least one device upon receiving an instruction by a user to transmit the captured photo image.

6. The method of claim 1, wherein each of the plurality of GUI elements visually identifies one or more of the respective contact information.

7. The method of claim 1, wherein the captured photo image and at least one of the plurality of GUI elements are displayed on a touchscreen.

8. The method of claim 1, wherein the address book is stored in the portable device.

9. The method of claim 1, further comprising displaying a confirmation that the captured photo image is transmitted.

10. A non-transitory computer readable medium encoded with a program for performing the method of claim 1 implemented using one or more computers.

11. A portable device to process a photo image, the portable device comprising:
a camera unit;
a display;
a transmitter, and
a controller configured to control the camera unit to capture the photo image including a plurality of persons, to determine respective IDentifier (ID) information corresponding to each of a plurality of devices and respective distances between the portable device and each of the plurality of devices, to associate each person from among the plurality of persons included in the captured photo image with respective contact information from an address book according to the determined respective ID information, to control the display to display the captured photo image and a plurality of Graphical User Interface (GUI) elements that respectively correspond to the respective contact information, and to control the transmitter to transmit the captured photo image to at least one device from among the plurality of devices corresponding to a GUI element from among the plurality of GUI elements based on the respective contact information, wherein the plurality of GUI elements are arranged in an order sorted according to the determined respective distances.

12. The portable device of claim 11, wherein the controller is further configured to determine the at least one device to which the captured photo image is transmitted by a selection of a user from among the plurality of GUI elements.

13. The portable device of claim 11, wherein the respective contact information comprises at least one of a phone number, a name, a nickname, and a mail address.

14. The portable device of claim 11, wherein the captured photo image is transmitted to the at least one device using the respective contact information.

15. The portable device of claim 11, wherein the controller controls to transmit the captured photo image to the at least one device upon receiving an instruction by a user to transmit the captured photo image.

16. The portable device of claim 11, wherein each of the plurality of GUI elements visually identifies one or more of the respective contact information.

17. The portable device of claim 11, wherein the display comprises a touchscreen.

18. The portable device of claim 11, wherein the controller is further configured to display a confirmation that the captured photo image is transmitted.

19. The portable device of claim 11, further comprising a memory in which the address book is stored.

* * * * *